United States Patent [19]

Talbott

[11] 4,182,247

[45] Jan. 8, 1980

[54] METHOD AND APPARATUS FOR CROP TRANSPLANTING

[76] Inventor: Gene B. Talbott, Box 173-D, Rte. 1, Banks, Oreg. 97106

[21] Appl. No.: 832,686

[22] Filed: Sep. 12, 1977

[51] Int. Cl.² .......................................... A01C 11/02
[52] U.S. Cl. ............................................. 111/3; 111/7
[58] Field of Search ................. 111/1, 2, 3, 4, 5, 6, 111/7, 7.1, 7.2, 7.3, 7.4, 89, 85, 52, 73, 74, 75, 76, 77, 79, 80, 81, 84, 86, 87, 88; 47/1.43; 239/147; 175/67, 422

[56] References Cited

U.S. PATENT DOCUMENTS

| 438,155 | 10/1890 | Hatherell | 239/147 |
|---|---|---|---|
| 797,531 | 8/1905 | Peters | 111/7.1 |
| 2,424,520 | 7/1947 | Tonkin | 111/7 |
| 2,719,498 | 10/1955 | Goolsby | 111/7 X |
| 2,789,522 | 4/1957 | Barton | 111/89 X |
| 3,025,806 | 3/1962 | Peck | 111/6 |
| 3,029,756 | 4/1962 | Krivda | 111/6 |
| 3,252,249 | 5/1966 | Propst | 47/1.43 |
| 3,394,667 | 7/1968 | White | 111/6 |
| 3,815,525 | 6/1974 | Kainson et al. | 111/6 |
| 3,926,131 | 12/1975 | Collins | 111/6 |

OTHER PUBLICATIONS

Huang, B. K. et al., "Design and Analysis of a Fluid Injection Spot and Furrow Means," *Transactions of the ASAE*, vol. 16, No. 3, (1973), pp. 114–119.

*Primary Examiner*—Clifford D. Crowder
*Assistant Examiner*—James R. Feyrer
*Attorney, Agent, or Firm*—Kolisch, Hartwell, Dickinson & Stuart

[57] ABSTRACT

A method and apparatus for transplanting crops includes a vehicular frame and a carriage reciprocally shiftable relative to the length of the frame. Plural fluid dispensing nozzles are mounted on the carriage for injecting fluid jets into the ground to form elongate, crop receiving cavities. The carriage is maintained substantially immobile relative to the ground during fluid injection while the frame may be continuously advanced. After the cavities are formed, seedlings are manually introduced thereinto.

4 Claims, 8 Drawing Figures

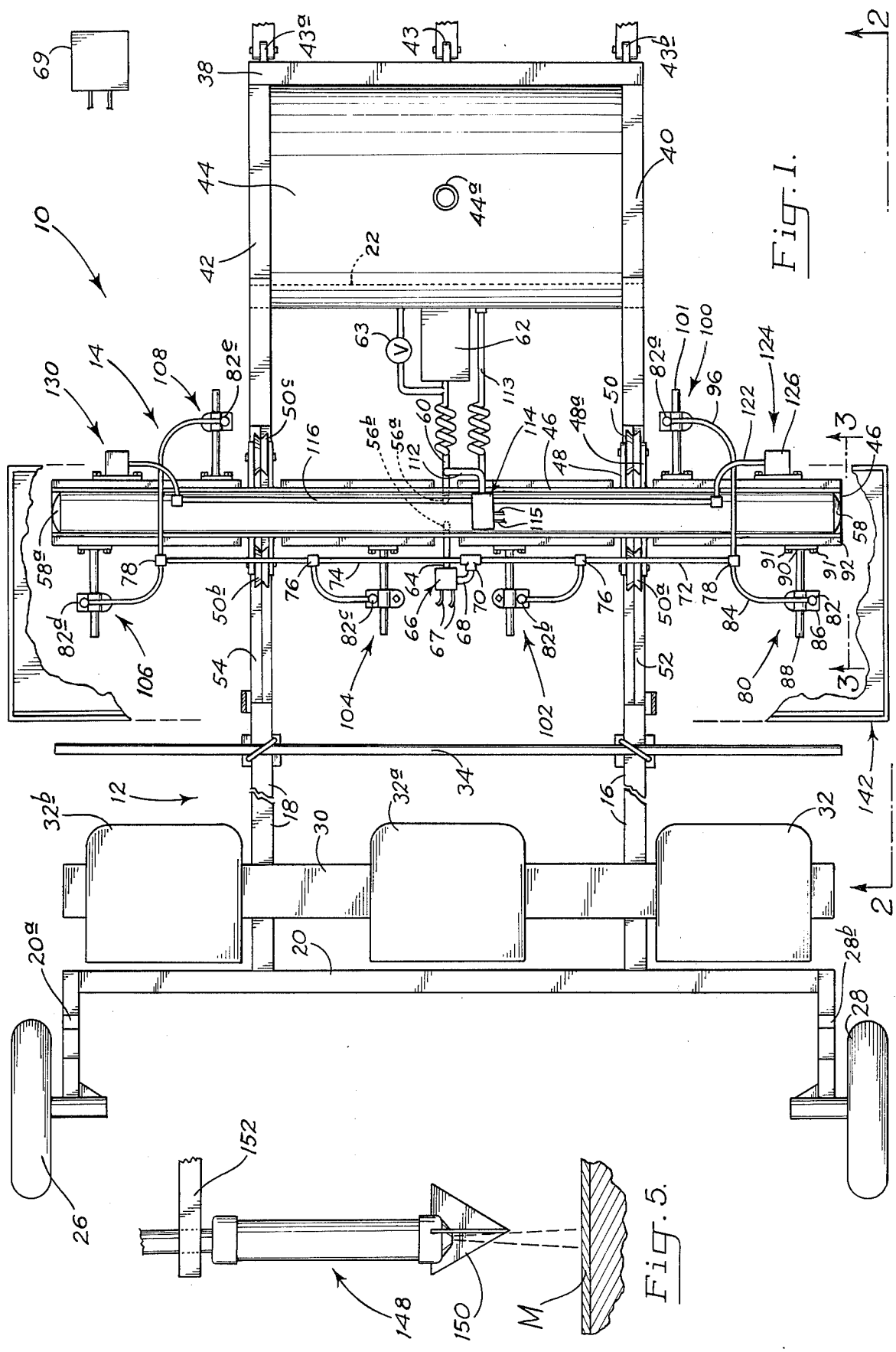

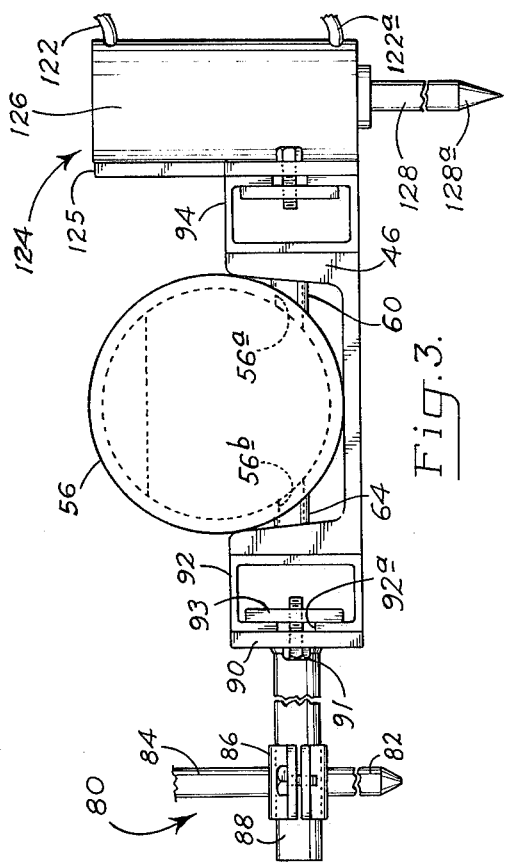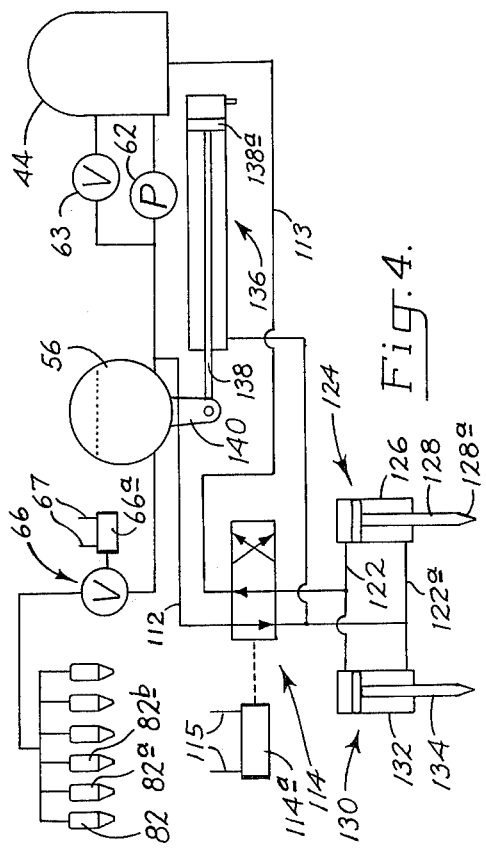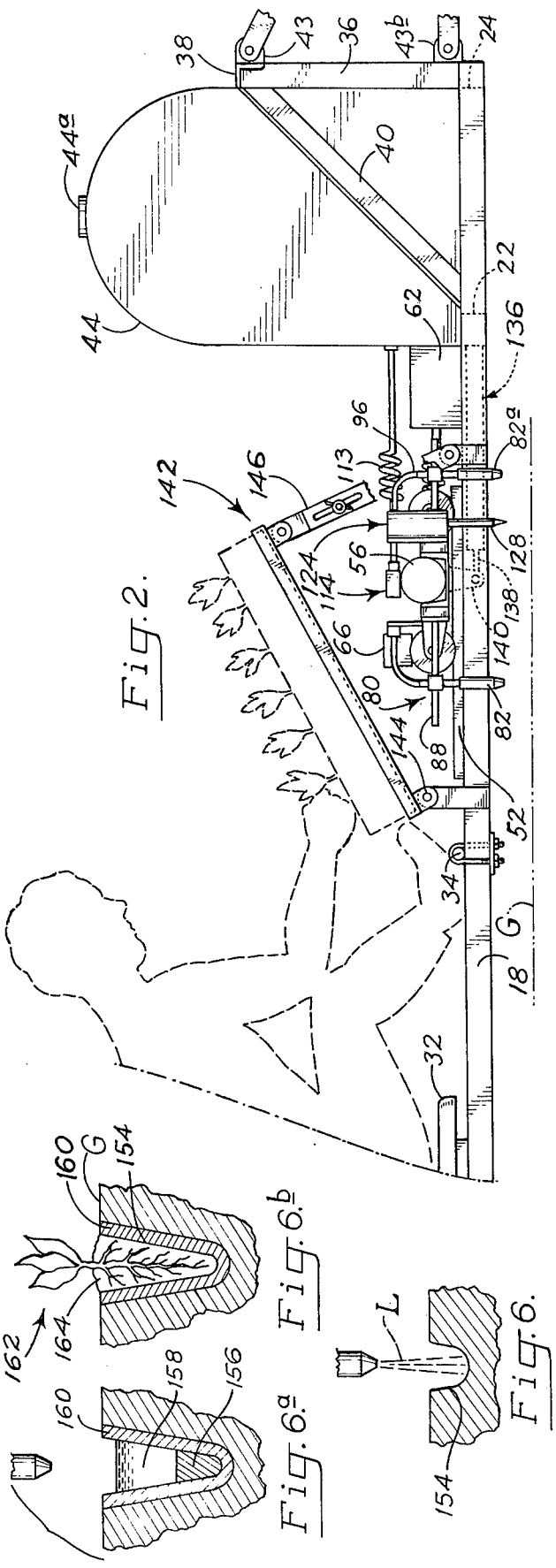

METHOD AND APPARATUS FOR CROP TRANSPLANTING

BACKGROUND AND SUMMARY OF THE INVENTION

The present invention relates to agricultural implements and equipment, and more particularly to a novel method and apparatus for use in preparing the ground for transplanting of crops or seedlings.

In recent years, there has been a significant trend in agriculture from directing seeding fields to field transplanting. This is especially true for so-called row and vegetable crops and field crops such as lettuce, celery, cucumbers, tomatoes, squash, etc. The first step in a seedling transplanting process is to seed soil-containing trays and germinate the seeds in a controlled greenhouse or nursery environment.

After the seedlings have grown to a certain size, the trays are transported to a field for seedling transplanting. This results in an improved efficiency in growing and harvesting, especially true for fields in which crop planting and harvesting occurs several times in a year.

The actual transplanting process is critical from the standpoint that seedlings must be delicately handled in order to prevent damage.

Prior art transplanting apparatus generally take the form of tractor-drawn implements or vehicles having shoes for opening or forming a furrow in the ground. The vehicles also include mechanical chains or wheels which serve as plant holders into which seedlings are manually placed. The holders are operative for selectively placing seedlings in a furrow formed by the shoes. Additionally, there may be provision for packing or bringing the soil in around a seedling by means of press wheels.

However, prior art transplanting apparatus are deficient from the standpoint that the plant holders can damage the crops during transplanting. Furthermore, additional damage can occur during mechanical packing in of soil around a transplanted seedling. Irrespective of seedling damage, it is to be noted that prior art transplanting apparatus generally include rather complex constructions resulting in high purchase prices as well as significant maintenance costs.

Other prior art apparatus may include complex drop tube and suction devices for dropping transplants into the ground. Such devices are also cumbersome and costly.

Accordingly, it is a general object of the present invention to provide a transplanting apparatus which will automatically and efficiently form seedling receiving cavities by injecting a fluid jet into the ground. More particularly, it is an object of the present invention to provide a vehicular-type transplanting apparatus on which plural fluid dispensing nozzles are mounted for forming relatively elongate cavities in associated crop rows.

Another object of the present invention is to provide a transplanting apparatus which forms elongate cavities in the ground having moist interior walls for snugly accommodating a seedling transplanted thereinto.

Yet another object of the present invention is to provide a transplanting apparatus including a vehicular frame on which is mounted a carriage shiftable forwardly and rearwardly relative to the frame. The carriage includes extendible-retractable ground penetrating members for selectively maintaining the carriage substantially immobile relative to the ground during travel of the frame over crop rows.

These and additional objects and advantages of the present invention will be more readily apparent after consideration of the following drawings and detailed description of the invention.

BRIEF DESCRIPTION OF THE DRAWINGS

FIG. 1 is a top or plan view of a transplanting apparatus according to the present invention and illustrates a shiftable carriage mounted on a tractor-drawn vehicular frame;

FIG. 2 is a side view taken along lines 2—2 of FIG. 1 and illustrates a seated individual using the transplanting apparatus;

FIG. 3 is an enlarged view taken along lines 3—3 of FIG. 1 and illustrates in further detail certain features of the carriage;

FIG. 4 is a schematic diagram illustrating fluid circuitry for operating fluid injecting nozzles and ground penetrating members mounted on the carriage;

FIG. 5 is an enlarged view of a fluid injecting nozzle having mechanical structure for penetrating a ground covering mulch sheet; and FIGS. 6, 6a and 6b are cross sections taken through the ground and illustrate the forming of a cavity according to the present invention and introduction of a seedling therewithin.

DETAILED DESCRIPTION OF THE PREFERRED EMBODIMENTS

Turning now to the drawings, and referring particularly to FIGS. 1 and 2, a transplanting apparatus according to the present invention is generally designated at 10. Apparatus 10 includes a vehicular frame, generally designated at 12, and a shiftable carriage means, generally designated at 14.

Frame 12 is constructed with laterally opposed elongate frame members 16, 18 interconnected by a rear frame member 20 and forwardly disposed frame members 22 and 24. Connected at opposite ends of frame member 20 are mounting members 20a, 20b adapted for mounting wheels 26, 28, respectively. Another transversely extending member, indicated at 30, is connected to frame members 16, 18 and supports a plurality of spaced apart seats 32, 32a and 32b. Disposed forwardly of the seats is an elongate, continuous foot rest 34 connected to frame members 16, 18. The ground is shown at G.

Moving now to the front of frame 12, it can be seen that upright members, one of which is indicated at 36, support a cross member 38. Bracing struts 40 and 42 extend from the upright members to frame members 16, 18, respectively. A three-point type hitch is indicated at 43, 43a and 43b. Mounted on frame members 22 and 24 is a fluid supply source such as storage tank 44 for holding a liquid such as water or water mixed with fertilizing chemicals. An inlet for permitting introduction of liquid into tank 44 is shown at 44a.

Referring to the middle portion of FIGS. 1 and 2, details of the aforementioned carriage means 14 will now be described. Carriage means 14 includes an elongate channel member 46 dimensioned to extend across frame 12. Extending outwardly from opposite sides of channel member 46 are mounting brackets, such as those shown at 48 and 48a for supporting associated roller means such as a V-grooved wheel 50. Additional wheels are shown at 50a, 50b and 50c. Track means, such as inverted V-shaped channels 52 and 54, are mounted on frame members 16, 18, respectively. Wheels 50,50a comprise a first wheel set mounted for engaging track means 52. Wheels 50b, 50c comprise a second wheel set which is mounted for engaging track means 54. Thus, it can be appreciated that carriage means 14 is reciprocally shiftable in a lengthwise direction relative to frame 12.

With reference now directed to FIG. 3, as well as FIGS. 1 and 2, there is shown a reservoir means such as an elongate cylinder 56 mounted on channel member 46. Cylinder 56 is provided with capped ends 58, 58a. Approximately intermediate the length of cylinder 56, there are provided ports 56a, 56b. An elongate, flexible conduit 60 (illustrated with a coiled portion) extends from port 56a through an aperture provided in a leg of channel 46 to a fluid pumping means, such as hydraulic pump 62. Pump 62 is mounted on tank 44 and is operable for continuously pumping fluid from the tank through conduit 60 into the interior of cylinder 56. A pressure relief valve is shown at 63.

Another conduit, such as shown at 64, extends from port 56b through an aperture in the opposite leg of channel member 46 to a first valve means such as solenoid-actuated valve 66. A solenoid is shown at 66a (see FIG. 4) and electrical leads 67 are indicated at 67. Leads 67 are connected to a sequencing mechanism or control means, generally indicated at 69, which is mounted on a transporting tractor. Extending from valve 66 is an elbow 68 connected to a T-fitting 70. Extending from opposite sides of fitting 70 are elongate conduits 72, 74 provided with additional fittings such as fittings 76, 78. Conduits 72, 74 are suitably supported on carriage means 14 by brackets (not shown). Extending from each of the fittings 76, 78 are flexible conduits or hoses which, in turn, are connected to fluid dispensing means or nozzles, to be hereinafter described.

For instance, as shown near the bottom of FIG. 1 (see also FIGS. 2 and 3), an adjustable nozzle assembly is indicated generally at 80 and includes a fluid dispensing means or nozzle 82 connected to flexible hose 84. Nozzle 82 is supported in a clamp bracket 86 which is releasably connected to an elongate supporting rod 88 for permitting selective sliding and positioning therealong. Rod 88 is mounted to carriage means 14 by means of a mounting plate 90 selectively positionable along a box-like guide 92. Guide 92 is secured to a leg of channel member 46 and includes a slotted face defining an elongate slot 92a extending along its length. Plate 90 is provided with threaded bolts 91 which are threadedly secured to a backing plate 93. Thus, it can be appreciated that tightening of bolts 91 urges plate 93 against an interior wall of guide 92 adjacent the slotted surface to rigidly support rod 88 at a predetermined position. Upon loosening of bolts 91, rod 88 may be slidably moved along slot 92a to any predetermined position along guide 92.

Extending from the opposite side of fitting 78 is another hose 96 connected to a nozzle 82a which comprises part of an adjustable nozzle assembly 100. Assembly 100 is constructed substantially similarly to assembly 80 so that nozzle 82a may be selectively positioned along carriage means 14 as well as along a rod 101. Other nozzles 82b, 82c, etc. are provided in adjustable nozzle assemblies 102, 104, 106 and 108 as shown in FIG. 1. The nozzles are include an orifice for forming a fluid jet.

With reference now directed particularly to FIGS. 1 and 4, it can be seen that a conduit 112 branches from conduit 60 and extends into a second valve means such as solenoid-actuated, four-way valve 114. Valve 114 is suitably mounted on carriage means 14. A solenoid is shown at 114a and electrical leads 115 are operatively connected with control means 69. Operation of the control means will be described at a later point.

Extending from opposite sides of valve 114 are pipe reaches or conduits 116 and 118 which are each connected to a fitting at their opposite ends. For instance, conduit 118 includes a fitting 120 from which extends a flexible conduit 122. Conduit 122 is connected to an impeding means, generally indicated at 124. Impeding means 124 includes a cylinder 126 housing an extendible-retractable fluid-actuated rod 128 (see FIG. 3). Rod 128 is provided with ground engaging means such as a point or spike 128a as shown in FIGS. 2-4. An exhaust conduit 122a, shown in FIGS. 3 and 4, is not illustrated in FIG. 1.

With reference now directed particularly to FIG. 3, it can be seen that cylinder 126 of impeding means 124 is secured to a mounting plate 125. Plate 125 is mounted on a guide 94 similarly to the mounting of guide 92 on channel member 46. Thus, it can be appreciated that cylinder 126 and rod 128 of impeding means 124 are selectively positionable along the length of guide 94 so as to be positioned at a predetermined location.

Likewise, from a consideration of the upper portion of FIG. 1 and FIG. 4, it can be seen that another impeding means 130 including a cylinder 132 and an extendible-retractable rod 134 is selectively positionable along an associated guide. Each of the impeding means 124, 130 is selectively operable for extending its associated rod into the ground so that carriage means 14 will be maintained substantially immobile relative to the ground during advancement of frame 12. The purpose of such a construction will be described subsequently.

Attention is now directed to FIG. 2, wherein there is illustrated at 136 a carriage return means. Return means 136 includes a cylinder having one end rigidly mounted to and supported by frame member 22. An extendible-retractable rod 138 is connected to a link or clevis 140. Clevis 140 is rigidly mounted to an underside of channel member 46 so that actuation of rod 138 will correspondingly horizontally shift carriage means 14 relative to the length of frame 12. FIG. 4 illustrates the fluid connection of carriage return means 136 with four-way valve 114 and storage tank 44.

As shown in FIG. 2, an adjustable, elongate rack, generally indicated at 142, extends across frame 12. Rack 142 is provided to support trays of seedlings, and is pivotally connected to frame 12 as shown at 144. An adjustable arm 146 is broken along its length to provide clarity for the other details on carriage means 14 shown in FIG. 2. Arm 146 permits selective positioning of rack 142 about connection 144.

Operation of the Transplanting Apparatus

Operation of apparatus 10 of the present invention for transplanting seedlings generally follows the following sequence. Frame 12 is hitched to the rear of a tractor (not shown) and carriage means 14 is initially shifted to a first or start position as shown in FIGS. 1 and 2. Trays of greenhouse-grown seedlings are loaded on rack 142 and the relative positions of nozzles 82, 82a, etc. are selectively fixed in order to provide for predetermined spacing between crop rows and between crops in a particular row. For instance, progressing upwardly from the bottom of FIG. 1 along carriage means 14, it can be seen that there are six nozzles. The spacing between each pair of nozzles corresponds to a predetermined crop row spacing. With respect to the spacing between adjacent nozzles in the longitudinal direction, such spacing will be selectively determined according to the specific spacing required between adjacent crops in a particular row.

As referred to previously, electrical leads 67 and 115 are connected to a tractor mounted sequencing mechanism or control means 69, such as a timer. The timer is sequenced to selectively actuate solenoids 66a, 114a and their corresponding valves 66, 114 depending upon a predetermined tractor speed which is set in the timer.

Individual field workers seat themselves in an associated seat (one worker being shown in FIG. 2) preparatory to apparatus 10 being transported over a portion of a field to be transplanted. Pump 62 is actuated so that liquid from tank 44 is pumped into the interior of reservoir means or cylinder 56. As shown in FIG. 3, the continuous pumping of liquid into cylinder 56 will compress air into an upper portion thereof of the. This compressed air will serve as a pressurized force to force fluid outwardly through conduit 64.

Initially, as shown in FIGS. 1, 2 and 4, carriage means 14 is disposed at a forward or start position on frame 12. Valve 114 is set in a first position as shown in FIG. 4 and valve 66 is closed. Liquid is regulated through valve 114 to retract rods 128, 134, as well as rod 138. The tractor-mounted timer is then started approximately simultaneously with forward movement of the tractor.

The tractor is advanced at approximately a constant rate, and after a predetermined time has elapsed, the timer actuates valve 114 to a second position so that liquid is transferred into cylinders 126, 132 to extend rods 128, 134, respectively. Liquid is simultaneously exhausted from a lower portion of cylinders 126, 132 and returned to tank 44 via flexible conduit 113. Upon extension of rods 128, 134 into the ground, it can be appreciated that carriage means 14 will remain substantially immobile relative to the ground during continuous advancement of frame 12. Wheel sets 50, 50a and 50b, 50c permit relatively unimpeded forward travel of frame 12 relative to ground-engaged, substantially immobile carriage means 14.

After penetration of rods 128, 134 and their associated spikes into the ground, solenoid-actuated valve 66 is opened to permit passage of liquid into dispensing nozzles 82, 82a, etc. Each nozzle 82, 82a, etc. is provided with a pressure regulator (not shown) so that a predetermined pressure build-up is required before the nozzle will outwardly inject a liquid jet. Each nozzle 82, 82a, etc. is positioned so that liquid will be injected substantially vertically into the ground. Upon simultaneous actuation of each nozzle 82, 82a, etc., liquid will be injected into the ground to form an elongate bore or cavity. Such a formation process is shown in FIGS. 6 and 6a.

It is to be noted that during travel of frame 12 relative to carriage means 14, rod 138 is permitted to move to the left, as shown in FIG. 4, because no liquid pressure acts on piston 138a of rod 138. After the transplanting cavities have been formed, a process taking from perhaps one to one and one-half seconds, the timer signals solenoids 66a and 114a to stop liquid flow to nozzles 82, 82a, etc. and retract rods 128, 134. Rod 138 in cylinder 136 is also retracted so that carriage means 14 is shifted to its forward or start position. The aforementioned workers then manually introduce seedlings into the cavities which directly precede them. This process is continuously repeated and permits rapid formation of cavities and manual introduction of seedlings.

Sometimes a field will be covered with a plastic sheet which serves as a mulch. If this is the case, it is necessary first to puncture a hole in the sheet before liquid can be injected into the ground. As shown in FIG. 7, a modified form of nozzle includes a spring biased, slidable sleeve indicated at 148. Sleeve 148 includes a piercing element 150 connected to a lower end. An arm 152 is provided to extend sleeve 148 downwardly toward the ground (upon a signal from the timer) so that element 150 will pierce a layer of sheet material designated at M. After such piercing, fluid is injected through the nozzle into a hole so pierced by element 150 in material M so that a cavity will be formed in the ground. Actuation of sleeve 148 downwardly is shown to be operated by an arm 152, but it must be appreciated that other fluid-actuated means could be employed to provide such movement.

Turning now to FIGS. 6, 6a and 6b, certain advantages of the liquid injection process of the present invention will be described. For instance, as shown in FIGS. 6 and 6a a liquid jet indicated at L forms a somewhat elongate cavity, generally indicated in cross section at 154, in the ground. As shown, cavity 154 has a somewhat wider base or top than its innermost tip. As shown in FIG. 6a, after cessation of liquid injection, cavity 154 is partially filled with a mud mixture indicated at 156 on top of which is situated water indicated at 158. A surrounding moist region indicated at 160 includes earth moistened by the injected liquid. Moist region 160 provides a so-called mud seal which will provide an extremely efficient adhesive or bonding surface for a seedling to be transplanted. As shown in FIG. 6b, a seedling, generally indicated at 162, includes a growth media and root zone indicated at 164.

Upon introduction of seedling 162 during a transplanting process, zone 164, being of earthen material itself, will readily adhere to moist region 160. Virtually all air will be driven out of cavity 154 during transplanting, and liquid will be permitted to seep or transfer from cavity 154 and moist region 160 into zone 164. It can be appreciated that the fine root system in zone 164 will receive nourishment almost immediately. Additionally, the adhesive qualities of moist region 160 will insure that a seedling, such as shown at 162, will be securely transplanted into the ground.

While it should be readily apparent that the transplanting process of the present invention provides a plurality of simultaneously formed cavities, it should be also be appreciated that transplanting apparatus 10 provides additional advantages. For instance, reciprocally shiftable carriage means 14 is selectively operable for immobilization relative to the ground during liquid injection. This insures that liquid, being directed substantially vertically into the ground will not form a cavity having an inappropriately large or furrowed opening extending in the horizontal direction. Furthermore, frame 12 is permitted to continue movement so that no interruption of travel occurs. This is especially important when it is considered that a tractor may be continuously advanced at a predetermined speed to permit uninterrupted transplanting.

Another advantage of the present invention resides in the fact that the aforementioned nozzle assemblies 80, 100, etc. permit selective adjustment not only of crop row spacing, but also of spacing between individual transplanted crops in a particular row.

Yet another advantage of the present invention resides in the fact that no external mechanical means are necessary for rearranging the soil after transplanting. For instance, as set forth previously, known apparatus generally include some type of ground engaging or sloped press wheeled construction for moving earth in around a transplanted seedling. This is necessary because mechanical shoes or other known cavity forming mechanisms invariably provide a cavity larger than needed to receive a seedling. As a consequence, mechanical moving of soil in around a transplanted seedling is necessary. Such movement of soil will tend to result in a compacted region around a transplanted seedling. Compacted soil often tends to promote weed growth, thus robbing the transplanted seedlings of necessary nutrients.

In contrast, the present invention requires no mechanical compacting or movement of soil around a transplanted seedling. The properly formed cavities snugly and securely receive seedlings. Thus, the soil can tend to remain in a loosened or plowed condition inhibiting growth of weeds.

Another advantage of the present invention resides in the fact that seedlings are introduced or transplanted manually. This is important from the standpoint that greenhouse or nursery grown seedlings often are quite delicate and subject to destruction if maneuvered by mechanical contrivances. With careful and attentive field workers, the seedlings may be readily lifted from trays and carefully transplanted into a cavity.

In another embodiment of the present invention, it is contemplated that a compressed air system may be utilized to pressurize water in tank 44 so that the water may be supplied from the tank to cylinder 56 for operation of the nozzles. Additionally, the compressed air system would operate impeding means 124, 130 and as well as rod 138 in cylinder 136. Pump 62 could thereby be eliminated to conserve space so that larger water tanks could be used, if desired.

Further, a nonpressurized reserve water tank may be mounted on the frame to supply transplant water by gravity flow to tank 44. Experience has shown that 100 gallons of water will be sufficient in transplanting well over an acre of cucumbers, squash, tomatoes, etc.

The compressed air system may be operated by a compressor driven by a small horsepower gas-driven engine. Thus, the need of a power take-off from a tractor to operate a pump, such as pump 62 shown in FIG. 4, will be unnecessary.

A solid state timing device may also be utilized with the compressed air system for controlling the impeding means as well as the carriage return cylinder. Electrical energy for the device may be supplied by the tractor battery. The timing device would actuate four-way valve 114 shown in FIG. 4. Complete flexibility and control may thereby be provided and it has been found that a one-half second water jet provides proper cavity formation in typical soil conditions.

While the invention has been particularly shown and described with reference to the foregoing preferred embodiment, it will be understood by those skilled in the art that other changes in form and detail may be made therein without departing from the spirit and scope of the invention as defined in the appended claims.

It is claimed and desired to secure by Letters Patent:

1. Apparatus for use in crop transplanting comprising:
   a vehicular frame;
   carriage means mounted on said frame selectively operable for reciprocal shifting relative to the lengthwise dimension of said frame;
   carriage return means mounted on said frame operable for selectively shifting said carriage means in a forward direction;
   plural fluid dispensing means mounted on said carriage means, each including a nozzle substantially vertically mounted and selectively operable for injecting a fluid jet into the ground for forming a crop receiving cavity which extends beneath the ground surface; and
   reservoir means mounted on said carriage means for storing fluid under pressure;
   a fluid supply source mounted on said frame including pump means operable for delivering fluid to said reservoir means;
   impeding means mounting on said carriage means operable for selectively maintaining said carriage means substantially immobile relative to the ground during travel of said frame thereover;
   first valve means mounted on said frame operable for selectively metering fluid from said reservoir means to said fluid dispensing means;
   second valve means mounted on said frame operable for selectively metering fluid from said fluid supply source to said impeding means; and
   control means interconnected to said first and second valve means, said control means being operable for actuating said first valve means to selectively meter fluid from said reservoir means to said fluid dispensing means and also being operable for actuating said second valve means to selectively meter fluid from said supply source to said impeding means and said carriage return means.

2. The apparatus of claim 1 wherein said impeding means includes fluid-actuated, extendible-retractable means selectively operable for penetrating the ground.

3. The apparatus of claim 1 further comprising adjusting means mounted on said carriage means for selectively positioning each of said nozzles at predetermined locations.

4. The apparatus of claim 3 wherein said frame includes track means and said carriage means includes an elongate member for supporting said reservoir means, said member including roller means mounted thereon for engaging said track means.

* * * * *